(12) United States Patent
Watanabe et al.

(10) Patent No.: US 7,171,243 B2
(45) Date of Patent: Jan. 30, 2007

(54) PORTABLE TERMINAL DEVICE

(75) Inventors: Yoshikazu Watanabe, Kawasaki (JP);
Ken Hayashida, Kawasaki (JP);
Takanobu Hattori, Kawasaki (JP);
Yoshitomo Ishii, Kawasaki (JP);
Yukinobu Arikawa, Tokyo (JP);
Kenichi Shinagawa, Tokyo (JP)

(73) Assignee: Fujitsu Limited, Kawasaki (JP)

( * ) Notice: Subject to any disclaimer, the term of this patent is extended or adjusted under 35 U.S.C. 154(b) by 501 days.

(21) Appl. No.: 10/077,963

(22) Filed: Feb. 20, 2002

(65) Prior Publication Data

US 2003/0032455 A1  Feb. 13, 2003

(30) Foreign Application Priority Data

Aug. 10, 2001  (JP) .............................. 2001-244075

(51) Int. Cl.
*H04B 1/38* (2006.01)
(52) U.S. Cl. .................. 455/566; 455/563; 379/88.04; 379/88.11; 715/841; 715/854
(58) Field of Classification Search ................ 455/566, 455/563, 569.1, 158.4, 158.5; 379/88.11, 379/88.14, 88.18, 88.01, 88.02, 88.03, 88.04; 715/841, 854
See application file for complete search history.

(56) References Cited

U.S. PATENT DOCUMENTS

| | | | | |
|---|---|---|---|---|
| 6,061,576 | A * | 5/2000 | Terrasson .................... | 455/566 |
| 6,072,492 | A * | 6/2000 | Schagen et al. ............. | 715/733 |
| 6,144,863 | A * | 11/2000 | Charron ....................... | 455/566 |
| 6,173,194 | B1 * | 1/2001 | Vanttila ....................... | 455/566 |
| 6,263,217 | B1 * | 7/2001 | Park ............................. | 455/566 |
| 6,449,496 | B1 * | 9/2002 | Beith et al. .................. | 455/563 |
| 6,466,136 | B2 * | 10/2002 | DeLine et al. ........... | 340/815.4 |
| 6,658,386 | B2 * | 12/2003 | Kemble et al. ............. | 704/270 |
| 6,751,593 | B2 * | 6/2004 | Tetsumoto ............... | 704/270.1 |
| 6,795,097 | B1 * | 9/2004 | Yamaguchi et al. ........ | 715/810 |
| 6,990,679 | B2 * | 1/2006 | Curreri ........................ | 725/56 |

FOREIGN PATENT DOCUMENTS

| | | |
|---|---|---|
| JP | 9-128189 | 5/1997 |
| JP | 2000-78662 | 3/2000 |

* cited by examiner

*Primary Examiner*—Edward F. Urban
*Assistant Examiner*—Blane J. Jackson
(74) *Attorney, Agent, or Firm*—Westerman, Hattori, Daniels & Adrian, LLP.

(57) ABSTRACT

A portable terminal is disclosed and which is adapted to display thereon a plurality of functions as a menu for allowing a desired one of the plurality of functions to be selected and executed, comprising: a detailed menu encompassing various functions of the overall portable terminal; a simplified menu including highly frequently used functions which are extracted from those of the detailed menu and having a hierarchy structure different from that of the detailed menu; and display switching means for switching between said first menu and said second menu to be displayed exclusively from each other. The portable terminal thus constructed is excellent in its operability in particular for users who are aged or unfamiliar with the portable terminal by the provision of the simplified and detailed for execution of readily menu manipulation.

9 Claims, 6 Drawing Sheets

| major items | medium items | minor items |
|---|---|---|
| retrieving incoming caller | | |
| operating mailer | retrieving received mails | |
| | composing mail | |
| | accessing templates | |
| | retrieving untransmitted mails | |
| | retrieving transmitted mails | |
| | center query (via mail) | |
| | service query | |
| | Bookmark | |
| | various settings for mail | editing signature |
| | | editing repetitive documents |
| | | automatic musical performance on mail arrival |
| | | mail arrival sound |
| retrieving telephone numbers | | |
| selecting incoming call sound | | |
| setting alarm | | |
| operating calculator function | | |
| service query | | |
| setting automatic answering telephone set | reproducing automatic answering telephone set | |
| | initiating automatic answering telephone set | |
| | stopping automatic answering telephone set | |
| | setting automatic answering telephone set | |
| activating and reproducing memorandums of messages | reproducing memorandums of messages | |
| | activating memorandums of messages | |
| initial settings | setting volume on arrival of incoming call | |
| | setting volume during call talking | |
| | setting speaker volume | |
| | setting vibrator | |
| | setting vocalization | |
| | adjusting date and time | |
| | setting caller telephone number notice service | |
| | switching to detailed menu | |

20 menu switching

Fig.2 (b)

| major items | medium items | minor items |
|---|---|---|
| display of incoming call history | | |
| mail | retrieving received mails | |
| | composing mail | |
| | accessing templates | |
| | retrieving untransmitted mails | |
| | retrieving transmitted mails | |
| | center query (via mail) | |
| | service query | |
| | Bookmark | |
| | various settings for mail | editing signature |
| | | editing repetitive documents |
| | | automatic musical performance on mail arrival |
| | | mail arrival sound |
| setting image | setting waiting image | |
| | setting saving mode | |
| convenient functions | setting alarm | |
| | activating memorandum of messages | |
| | reproducing memorandum of messages | |
| | word registration | |
| | calculator | |
| returning to simplified menu | | |
| service query | | |
| display of call information | | |
| other functions | retrieving telephone numbers | |
| | setting incoming call | selecting normal incoming-call sound |
| | | adjusting incoming-call volume |
| | | setting vibrator |
| | | operation without caller number |
| | | number-plus registration |
| | | automatic answering |
| | | automatic speakerphone |
| setting communication | | notice of caller number |
| | | setting fax mode |
| | | incoming call transfer talky |
| | | setting battery saving |
| | | setting reconnection |
| | | setting vehicle-mounded HF |
| setting time | | setting date and time |
| | | setting auto-on |
| | | setting auto-off |
| setting tone | | setting reception sound volume |
| | | setting speaker volume |
| | | setting key confirmation tone |
| | | setting sound at charging completion |
| | | alarm sound for remaining number of times |
| | | battery alarm sound |
| | | switching incoming call sound |
| | | quality alarm sound |
| | | talking holding sound |

"simplified menu"

"detailed menu"

detailed menu

Fig.6 (b)

simplified menu

Fig.7 (a)

| major items | medium items | minor items |
|---|---|---|
| retrieving incoming caller | | |
| operating mailer | retrieving received mails | |
| | composing mail | |
| | accessing templates | |
| | retrieving untransmitted mails | |
| | retrieving transmitted mails | |
| | center query (via mail) | |
| | service query | |
| | Bookmark | |
| | various settings for mail | editing signature |
| | | editing repetitive documents |
| | | automatic musical performance on mail arrival |
| | | mail arrival sound |
| retrieving telephone numbers | | |
| selecting incoming call sound | | |
| setting alarm | | |
| operating calculator function | | |
| service query | | |
| activating and reproducing | reproducing memorandums of messages | |
| memorandums of messages | activating memorandums of messages | |
| initial settings | setting volume on arrival of incoming call | |
| | setting volume during call talking | |
| | setting speaker volume | |
| | setting vibrator | |
| | adjusting date and time | |
| | setting caller telephone number notice service | |
| | switching to detailed menu | |

20 menu switching

Fig.7 (b)

| major items | medium items | minor items |
|---|---|---|
| display of incoming call history | | |
| mail | retrieving received mails | |
| | composing mail | |
| | accessing templates | |
| | retrieving untransmitted mails | |
| | retrieving transmitted mails | |
| | center query (via mail) | |
| | service query | |
| | Bookmark | |
| | various settings for mail | editing signature |
| | | editing repetitive documents |
| | | automatic musical performance on mail arrival |
| | | mail arrival sound |
| setting image | setting waiting image | |
| | setting saving mode | |
| convenient functions | setting alarm | |
| | activating memorandum of messages | |
| | reproducing memorandum of messages | |
| | word registration | |
| | calculator | |
| returning to simplified menu | | |
| service query | | |
| display of call information | | |
| other functions | retrieving telephone numbers | |
| | setting incoming call | selecting normal incoming-call sound |
| | | adjusting incoming-call volume |
| | | setting vibrator |
| | | operation without caller number |
| | | number-plus registration |
| | | automatic answering |
| | | automatic speakerphone |
| | setting communication | notice of caller number |
| | | setting fax mode |
| | | incoming call transfer talky |
| | | setting battery saving |
| | | setting reconnection |
| | | setting vehicle-mounted HF |
| | setting time | setting date and time |
| | | setting auto-on |
| | | setting auto-off |
| | setting tone | setting reception sound volume |
| | | setting speaker volume |
| | | setting key confirmation tone |
| | | setting sound at charging completion |
| | | alarm sound for remaining number of times |
| | | battery alarm sound |
| | | switching incoming call sound |
| | | quality alarm sound |
| | | talking holding sound |

PORTABLE TERMINAL DEVICE

BACKGROUND OF THE INVENTION

1. Field of the Invention

The present invention relates generally to a portable terminal adapted to display thereon a plurality functions as a menu for allowing a desired one of the plurality of functions to be selected and executed, and more particularly, it relates to a portable terminal adapted to display thereon one of two menus independently from each other.

2. Description of the Related Art

There is known a portable terminal such as a portable telephone set, which displays as a menu a plurality of functions, e.g., functions for receiving and /or transmitting e-mail and for setting a timer, and allows a user to select and execute a desired one among the functions of the menu. By means of such a menu operation or manipulation, predetermined functions can readily be executed through a simple manipulation and therefore it is very convenient for the portable telephone set which is often operated with one hand. Thus, a recently developed portable terminal is designed to display thereon various functions as a menu to allow each of functions to be selected and executed. Accordingly, such a menu must clearly be displayed on a display screen of the portable terminal to enable a user to view and select one of the functions for its execution.

However, as the number of functions to be displayed on the display screen as a menu is increased, it will be gradually difficult to view and confirm functions of the menu individually. Therefore, it is very difficult to readily select a desired one of the functions of the menu, as result of which it will be deteriorated in operability particularly for users who are aged or have weak eyesight.

On the other hand, such functions as being used commonly and frequently by many users are only a few functions of all functions displayed as a menu in a conventional portable terminal.

It is therefore an object of the present invention to provide a portable terminal capable of displaying many functions as a menu and particularly capable of easily viewing frequently used functions, thereby providing a portable terminal which is highly excellent in operability.

SUMMARY OF THE INVENTION

According to the present invention, a portable terminal adapted to display thereon a plurality of functions as a menu for allowing a desired one of the plurality of functions to be selected and executed, comprising: said menu including first and second menus, each having a hierarchy structure, respectively; said second menu having a menu for supporting all of functions of said portable terminal; said first menu being composed of functions extracted from those of said second menu and having the hierarchy structure different from that of said second menu; and display switching means for switching between said first menu and said second menu to be displayed.

As an example of the portable terminal according to the present invention, a portable telephone set may be exemplified for here. For example, if a detailed menu encompassing various functions of the overall portable telephone set is used as the second menu, some functions which are included in functions of the second menu are used as the first menu, and menu items composing the first menu are positioned on a shallower hierarchy than that on which corresponding menu items of the second menu are positioned, then a user can easily access a desired one of the menu items included in the first menu. Thus, a certain function can be selected and executed by switching between menus according to a purpose for using the portable telephone set and therefore the portable telephone set is excellent in its operability for users inclusive of users who are aged or unfamiliar to the portable telephone set.

In accordance with an aspect of the present invention, the functions of which said first menu is composed can be set to frequently used functions extracted from those of the second menu. Specifically, there is provided, as well as a detailed menu including many functions, a simplified menu having only frequently used functions which are extracted and independent from functions of the detailed menu. Therefore, users can switch these two menus from one to another. Consequently, the portable telephone set having such a highly viewable simplified menu enables users who are aged or unfamiliar to the portable telephone set to view and select a desired one of the functions of the simplified for its execution. According to the present invention, there is provided a portable telephone set which is highly excellent in its operability.

In accordance with another aspect of the present invention, each of the first and second menus includes a display switching function as a menu item for switching from one to another, the display switching means being activated upon execution of the display switching function. Therefore, the portable terminal is excellent in its operability because two menus can be switched from one to another by means of the display switching function.

In accordance with yet another aspect of the present invention, the first and second menus have hierarchy structures, respectively, and the display switching function of the first menu is positioned on a deeper hierarchy than that of the display switching function of the second menu. Specifically, each of a simplified menu (the first menu) and detailed menu (the second menu) is composed of three levels or hierarchies for major items, medium items and minor items. An item for the display switching function of the simplified menu is provided on the level of medium items thereof while one for the detailed menu is provided on the level of major items thereof. Accordingly, it is necessary to take only one step for switching from the detailed menu to the simplified menu, while it is necessary to take two steps for switching from the simplified menu to the detailed menu. Consequently, it is possible to prevent users who are aged or unfamiliar with the portable terminal (e.g., the portable telephone set) from erroneously switching directly from the simplified menu to the detailed menu. Also, even after switched to the detailed menu, it is possible to easily return to the simplified menu.

In accordance with still another aspect of the present invention, the first and second menus are stored in separate memory regions different from each other. Due to this configuration, these simplified and detailed menus are held independently from each other so that these menus can be displayed exclusively from each other. Consequently, it is avoidable to confuse users during their menu manipulations because, during displaying one menu which has been selected as a setup image, there is no tendency to switch to another menu. In particular, according to an embodiment of the present invention, predetermined data used for execution of these menus are stored in a common memory region so that data managements can be unified and prevention of increase of memory can be achieved.

In accordance with a still further aspect of the present invention, the portable terminal further comprises vocally displaying means for vocally displaying predetermined operation contents displayed as the first menu. In particular, the vocally displaying means is capable of, upon selection of any one of functions of the first menu, vocalizing the selected function. According to an embodiment of the present invention, if any one of items is designated by a cursor during display of the simplified menu, that designated item is vocalized by referring to a voice library stored in a memory via the sound source LSI. Also, the previously stated display switching means is capable of displaying the first menu by using larger letters in comparison with those used on said second menu. It advantageously allows users who are aged or have weak eyesight to easily read such menu items. Also, the number of the menu items is about 3 items at most, as a result of which their items are highly viewable so as to select one of them with ease. It leads to an improved operability of the portable terminal.

Furthermore, if the portable terminal is configured to display thereon such a simplified menu preferentially upon power-up of the portable terminal, then it is convenient for a user who preferentially use the simplified menu because of omission of laborious steps for switching to the simplified menu. It leads to a further improved operability of the portable terminal. Also, it is possible to prevent users who are aged or unfamiliar with the portable terminal (e.g., the portable telephone set) from erroneously switching from the simplified menu to the detailed menu. Also, even after switched to the detailed menu, it is possible to easily return to the simplified menu upon reactivation of the portable terminal after turning off and then on the power supply in the event that the user is confused in the menu manipulation during display of the detailed menu.

BRIEF DESCRIPTION OF THE DRAWINGS

FIG. 2(a) shows a configuration example of a simplified menu used for the portable telephone set according to the embodiment;

FIG. 2(b) shows a configuration example of a detailed menu used for the portable telephone set;

FIG. 7(a) shows a configuration example of a simplified menu according to another embodiment; and FIG. 7(b) shows a configuration example of a detailed menu according to another embodiment.

DESCRIPTION OF THE PREFERRED EMBODIMENT

Hereinafter a preferred embodiment of the present invention will be described in detail with reference to the accompanying drawings. The present preferred embodiment will be exemplified by a portable telephone set, which is adapted to display thereon a detailed menu having many executable functions and display thereon a simplified menu having only frequently used functions extracted from functions of the detailed menu, thereby reducing the number of menu items as compared with ones of the detailed menu. In the preferred embodiment as set forth below, an example concerning controlling operation or manipulation of a menu and display will be described in detail.

Figure 1:
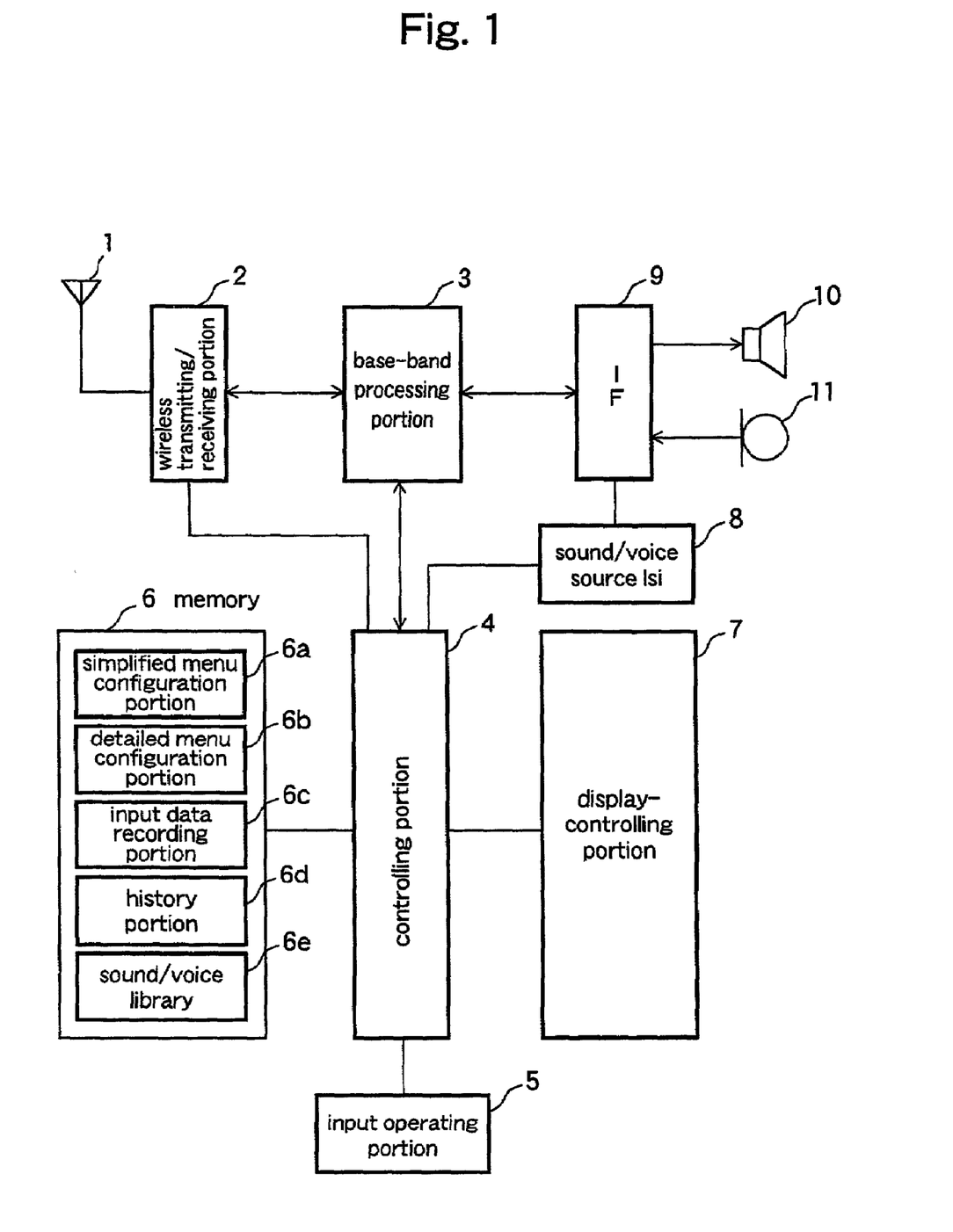
FIG. 1 is a block diagram showing a portable telephone set according to an embodiment of the present invention.

Referring now to the drawings, FIG. 1 is a block diagram showing a portable telephone set of the preferable embodiment according to the present invention. The portable telephone set comprises: an antenna 1 for receiving a radio wave; a wireless transmitting/receiving portion 2 connected to the antenna 1; a base-band processing portion 3; an input operating portion 5 into which telephone number and/or information is inputted by a user's key-operation; a memory 6 in which various data are stored, a display-controlling portion 7; a sound source/voice LSI 8 for outputting a sound/voice; an interface(IF) 9; a speaker 10; a microphone 11; and controlling portion 4. The controlling portion 4 is connected to the previously-stated portions and particularly, via the sound/voice source LSI 8 and IF 9, connected to the speaker 10 and microphone 11. The memory 6 comprises: a simplified menu configuring portion 6a for storing data used to configure the simplified menu; a detailed menu configuring portion 6b for storing data used to configure the detailed menu; an input data recording portion 6c for recording data and setting values inputted by a user; a history portion 6d for storing incoming and outgoing call histories of the portable telephone set; and a sound/voice library 6e for storing various sound/voice data used to vocalize the simplified menu items and the like.

FIG. 2(a) illustrates a configuration example of the simplified menu and FIG. 2(b) illustrates a configuration example of the detailed menu. The controlling portion 4 read from the simplified or detailed menu portions 6a, 6b data required for displaying on a display screen (not shown) either one of the menus controlled by the display-controlling portion 7. Specifically, it should be noted that each of the simplified and detailed menus is composed of three levels or hierarchies, i.e., major items, medium items and minor items. The simplified menu is composed of relatively frequently used functions of the detailed menu functions. In FIGS. 1(a) and 1(b), there are shown corresponding items between the simplified and detailed menus connected together by lines. It should be appreciated that the simplified and detailed menus are independent of each other. Hence, there is no occurrence that these simplified and detailed menus can be switched from one to another, except by executing a menu switching 20. As is clear from the FIG. 2 representation, a certain item among the minor items of the detailed menu may be itemized as one of the major or medium items of the simplified menu. The simplified menu is thus configured to readily access frequently used functions thereof.

FIG. 3(a) shows an exemplary displaying example of the simplified menu and FIG. 3(b) shows an exemplary displaying example of the detailed menu. As is clear from FIGS. 3(a) and 3(b), the simplified menu is displayed on the display screen by using larger letters in comparison with those used on the detailed menu (in the present embodiment, the simplified menu uses letters of 20 dots and the detailed menu uses letters of 12 dots) so that the number of the menu items is about 3 items at most, as a result of which their items are highly viewable so as to select one of them with ease. As compared with the simplified menu, the detailed menu is displayed on the display screen by using smaller letters so as to show more menu items.

Figure 3:
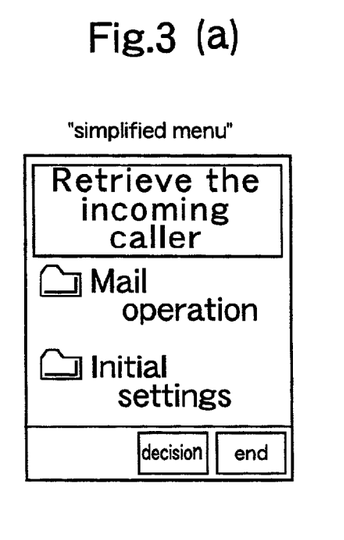
FIG. 3(a) shows an exemplary displaying example of the simplified menu.
FIG. 3(b) shows an exemplary displaying example of the detailed menu.

According to this embodiment of the present invention, if any one of items is designated by a cursor during display of the simplified menu, that designated item is vocalized by referring to the sound/voice library 6e stored in the memory 6 via the sound/voice source LSI 8. In FIG. 3(*a*), the cursor is placed on an item "RETRIEVE INCOMING CALLER" so that the name of incoming caller is vocally outputted by referring to vocal data corresponding to the item "RETRIEVE INCOMING CALLER" retrieved from the sound/voice library 6e. It is also possible to set such a vocal output to be prohibited by manipulating the simplified menu.

Upon activation of the portable telephone set, the simplified menu is normally displayed on the display screen. When it is desired to switch from the simplified menu to the detailed menu and execute a function of the detailed menu, a user can select an item "SWITCHING TO DETAILED MENU" on the display screen during displaying the simplified menu. On the contrary, if desired to return from the detailed menu to the simplified menu during displaying the detailed menu, it is possible to select an item "RETURNING TO THE SIMPLIFIED MENU" on the display screen during displaying the detailed menu. In FIGS. 2(*a*) and 2(*b*), as designated by a reference numeral 20 for a menu switching, a level or hierarchy of a function for the menu switching differs between the simplified and detailed menus. Specifically, the item "SWITCHING TO DETAILED MENU" of the simplified menu is positioned as one of the medium items on a level of which it is relatively difficult to perform the menu-switching operation, while the item "RETURNING TO SIMPLIFIED MENU" of the detailed menu is positioned as one of the major items on a level of which it is relatively easily to perform the menu-switching operation with less procedures as compared with that of the simplified menu. Due to this, it is possible to reduce mis-operations so as to erroneously switch from the simplified menu to the detailed menu by users who are aged or unfamiliar to the portable telephone set. However, even if erroneously switched from the simplified menu to the detailed menu, it is possible to return to the simplified menu with ease.

Figure 4:
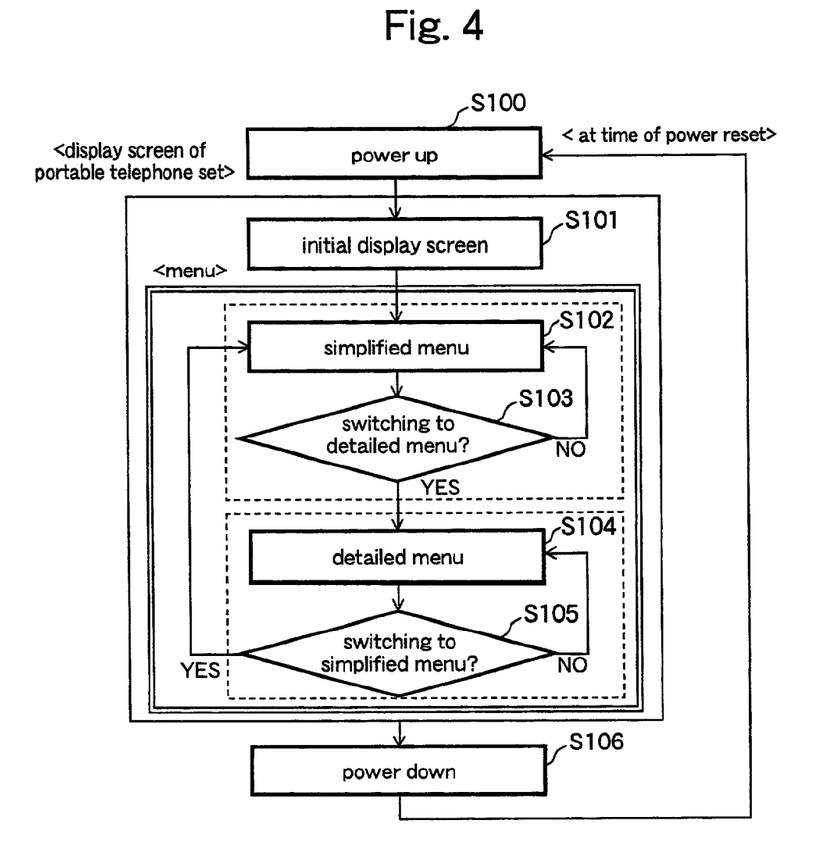
FIG. 4 is a control flow-chart for a menu-switching operation.

FIG. 4 is a control flow-chart for the menu-switching operation as described above. In step 100, firstly a user powers up the portable telephone set. Upon activation, an initial picture is displayed on the display screen by the controlling portion 4 (step 101). After the display of the initial picture, the controlling portion 4 further displays on the display screen the simplified menu set as a default (step 102). At this point, if instructed to switch from the simplified menu to the detailed menu (step 103, YES), the detailed menu is displayed on the display screen by the controlling portion 4.

Figure 5:
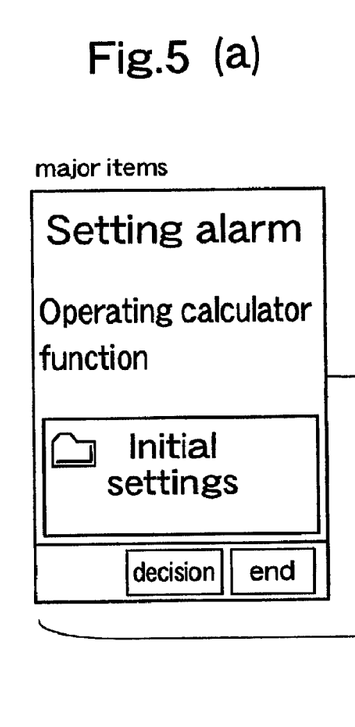
FIG. 5 shows a menu manipulation for switching from the simplified menu to the detailed menu.

A menu operation or manipulation for switching to the detailed menu is exemplarily shown in FIG. 5 and its switching procedures are as follows:

In FIG. 5(*a*), the cursor is firstly placed on a display of "INITIAL SETTINGS (or INITIAL SETTINGS TO BE FIRSTLY PERFORMED)" as one of the major items of the simplified menu and then a display of "DECISION" button is depressed. Then, a medium item menu of the "INITIAL SETTINGS" appears on the display screen as shown in FIG. 5(*b*). Subsequently, a display of "SWITCHING TO DETAILED MENU" is selected by placing the cursor thereon and the "DECISION" button is depressed. Consequently, a display screen for a switching setting appears as shown in FIG. 5(*c*). As a display of "DO YOU SWITCH TO DETAILED MENU?" appears, a display of "YES" is selected by the cursor and the "DECISION" button is depressed. If various menus are placed in a vocalized mode, it is of course possible to vocalize letters displayed on the display screen at the time when the cursor is placed thereon. Thus, if the switching to the detailed menu is instructed on the display screen as shown in FIG. 5(*c*), then the detailed menu appears on the screen as shown in FIG. 5(*d*).

Returning to FIG. 4, if an instruction for switching to the simplified menu is given during display of the detailed menu (step 105, YES), the simplified menu is displayed on the display screen by the controlling portion 4 (step 102).

Figure 6:
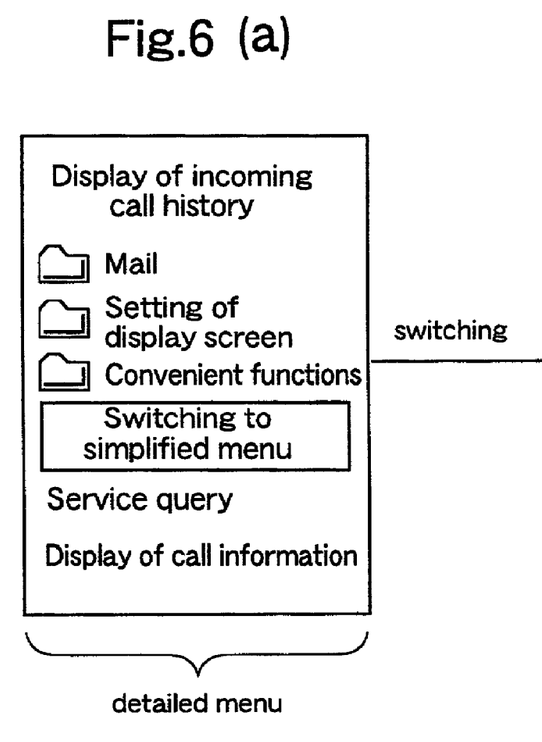
FIG. 6 shows a menu manipulation for switching from the detailed menu to the simplified menu.

An example of the menu manipulation for switching to the simplified menu is shown in FIG. 6. A display of "CHANGE TO SIMPLIFIED MENU" as one of the major items of the detailed menu is selected by placing the cursor thereon and then decision button is depressed as shown in FIG. 6(*a*). Immediately thereafter, the detailed menu is switched to the simplified menu on the display screen. Although the switching from the simplified menu to the detailed menu needs to sequentially execute several procedures with some complication, the switching from the detailed menu to the simplified menu is relatively easily performed.

Also, when the portable telephone set is reactivated (steps 106 and 100), the simplified menu will be normally displayed after the initial display screen (step 102). In this manner, since the simplified menu is used as a default according to this embodiment, it is surely enabled to return the display screen to the simplified menu by turning off and then on the power supply in the event that the user is confused in the menu manipulation.

According to this embodiment of the present invention, it is also possible to customize the simplified and detailed menus depending on user's taste. Although not illustrated in the drawings, each of the simplified and detailed menus has menu items for executing such a customizing function. The customization such as deletion of a certain menu item, rearrangement of the menu items, modification of the hierarchy structure and the like, can easily be executed on the display screen of the portable telephone set. In this case, there is provided in the memory 6 memory regions for storing such customized simplified-menu and detailed-menu configuring portions, aside from memory regions for the simplified menu configuring portion 6a and detailed menu configuring portion 6b.

According to this embodiment of the present invention, even if the menu has been customized in this manner, the simplified menu in a state before the customization would always been displayed on the display screen upon activation of the portable telephone set. Also, if the portable telephone set has such four menus (the simplified and customized simplified menus and the detailed and customized detailed menus) stored therein (not shown), it is possible to switch among the four menus for selecting one of them and display it on the display screen. On the contrary, it is possible to prohibit a directly switching from the simplified menu after the customization to the detailed menu before the customization (or from the detailed menu after the customization to the simplified menu before the customization).

According to this embodiment of the present invention, there can be listed, on the simplified menu, menu items which is not extracted from items of the detailed menu (e.g., a medium item "SETTING VOCALIZATION" of the major item "INITIAL SETTINGS"). The present invention is not only limited to the hierarchy structure as shown in FIG. 2 but also adapted to that as shown in FIG. 7 where all of menu items of the simplified menu are extracted from the menu items of the detailed menu.

It will be appreciated to those skilled in the art that the embodiment of the present invention has been described above in form of a portable telephone set by way of example. It is not intended that the present invention is limited to that, but the present invention can be adapted to PDA and other various portable information terminals capable of receiving and/or transmitting functions.

According to the present invention as described above, it is possible to provide a portable terminal suitable for a variety of users who are aged or unfamiliar with the menu manipulation because the provision of frequently used functions as the simplified menu in addition to the detailed menu. Also, in the portable terminal, the simplified and detailed menus are switchable therebetween while the switching from the simplified menu to the detailed menu requires complicated procedures. Due to this, it results in reduction of erroneous manipulations, e.g., switching from the simplified menu to the detailed menu mistakenly, caused by users who are aged or unfamiliar with the menu manipulation. On the contrary, the switching from the detailed menu to the simplified menu can be relatively plainly and easily executed. Accordingly, even if switched to the detailed menu by mistake, it is possible for users who are aged or unfamiliar with the menu manipulation to readily return to the simplified menu from the detailed menu.

Also, since the portable terminal is configured to display thereon the simplified menu preferentially upon power-up or activation of the portable terminal, it is possible to easily return to the simplified menu upon reactivation of the portable terminal after turning off and then on the power supply in the event that the user is confused in the menu manipulation. Therefore, it allows users to execute various menu manipulations without anxiety.

Furthermore, since the simplified menu is designed to be displayed by using larger letters in comparison with those used on the detailed menu, it advantageously leads to an improved operability of the portable terminal to be suitable for users who are aged or unfamiliar with the menu manipulation. In particular, if any one of items is designated by a cursor during display of the simplified menu, that designated item can be vocalized. It results in a portable terminal being excellent in operability in particular for users who are aged or having weak eyesight.

The foregoing description of a preferred embodiment of the invention has been presented for purposes of illustration and description. It is not intended to be exhaustive or to limit the invention to the precise form disclosed. Obvious modifications or variations are possible in light of the above teachings. The embodiment was chosen and described in order to best illustrate the principles of the invention and its practical application to thereby enable one of ordinary skill in the art to best utilize the invention in various embodiments and with various modifications as are suited to the particular use contemplated. It is intended that the scope of the invention be defined by the claims appended hereto.

What is claimed is:

1. A portable terminal device adapted to display thereon a plurality of functions as a menu for allowing a desired one of the plurality of functions to be selected and executed, comprising:

said menu including first and second menus, each having a hierarchy structure, respectively;

said second menu having a menu for supporting a plurality of functions of said portable terminal device;

said first menu being composed of functions extracted from those of said second menu and having the hierarchy structure different from that of said second menu; and display switching section that switches between said first menu and said second menu to be displayed, wherein a medium level of said hierarchy of said first menu has a function of switching to said second menu and a highest level of said hierarchy of said second menu has a function of switching to said first menu.

2. The portable terminal device according to claim 1, wherein the functions of said first menu is composed are set to frequently used functions among those of said second menu.

3. The portable terminal device according to claim 1, wherein each of said first and second menus includes a display switching function, as a menu item, for switching from one to another, said display switching section being activated upon execution of said display switching function.

4. The portable terminal device according to claim 1, wherein the display switching function of said first menu is positioned on a deeper hierarch than that of the display switching function of said second menu.

5. The portable terminal device according to claim 1, wherein said first and second menus are stored in memory regions different from each other.

6. The portable terminal device according to claim 1, further comprising vocally displaying section that vocally displays predetermined operation contents displayed as said first menu.

7. The portable terminal device according to claim 6, wherein said vocally displaying section is capable of, upon selection of any one of functions of said first menu, vocalizing the selected function.

8. The portable terminal device according to claim 1, wherein said first menu is displayed by using larger letters in comparison with those used on said second menu.

9. A portable terminal device adapted to display thereon a plurality of functions as a menu for allowing a desired one of the plurality of functions to be selected and executed, comprising:

said menu including first and second menus, each having a hierarchy structure, respectively;

said second menu having a menu for supporting a plurality of functions of said portable terminal device;

said first menu being composed of functions extracted from those of said second menu and having the hierarchy structure different from that of said second menu; and display switching section that switches between said first menu and said second menu to be displayed, wherein said display switching section is capable of displaying said first menu preferentially upon power on of said portable terminal device, wherein a medium level of said hierarchy of said first menu has a function of switching to said second menu and a highest level of said hierarchy of said second menu has a function of returning said first menu.

* * * * *